April 25, 1967　　R. O. SPENCER　　3,315,326
TIE-DOWN APPARATUS
Filed Jan. 6, 1965
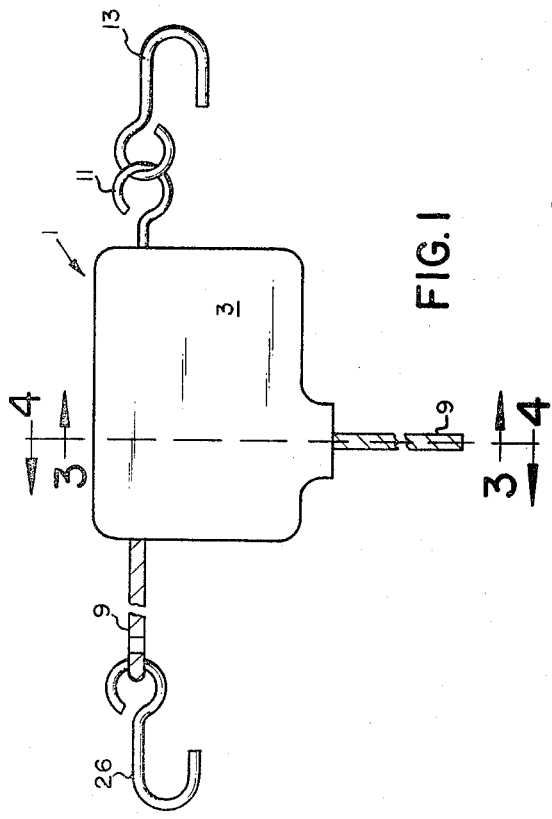
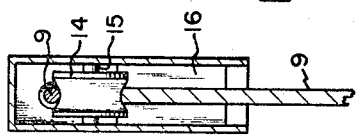
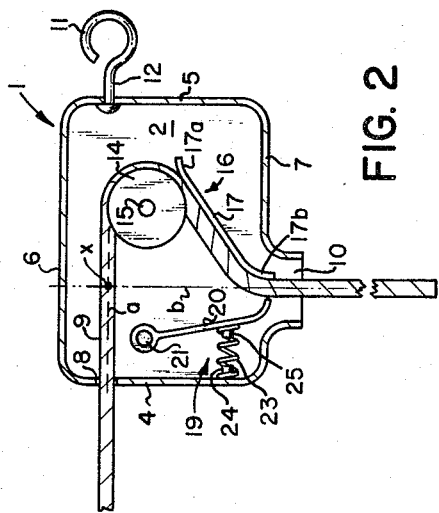
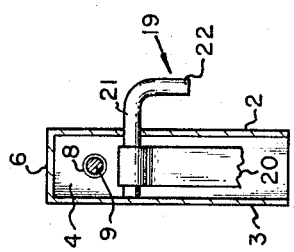
INVENTOR.
ROBERT O. SPENCER
BY
*Learman, Learman & McCulloch*
ATTORNEYS nited States Patent Office 3,315,326
Patented Apr. 25, 1967

3,315,326
TIE-DOWN APPARATUS
Robert O. Spencer, 1809 Gihon Road,
Parkersburg, W. Va. 26107
Filed Jan. 6, 1965, Ser. No. 423,790
4 Claims. (Cl. 24—134)

This invention relates to tie-down apparatus and more particularly to a portable, manually operable device which may be anchored to a supporting structure and maintain another object in fixed relation relative to the support.

Apparatus constructed in accordance with the invention is especially adapted for use in those instances where a movable object is to be releasably fixed in position relative to a fixed object. For example, the apparatus is adapted for use in tying down the lid of a trunk, for tying objects or loads in place on vehicles, or for securing a length of rope or the like around an object to maintain the object closed. In addition, the apparatus is adapted for use in adjusting the tension on such devices as tent ropes, guy wires, well lines, ramp lines, ship rigging, or in any other instance where a flexible rope or line is to be releasably maintained under tension.

An object of the invention is to provide tie-down apparatus which is substantially universally adaptable for use with flexible lines, ropes and cables for releasably maintaining the latter under tension.

Another object of the invention is to provide tie-down apparatus of the character described which is of simplified and economical construction.

A further object of the invention is to provide tie-down apparatus of the class referred to and which is so constructed as to enable the user to exert the forces applied to the anchored device to be distributed more uniformly between the anchor rope and the casing in which the clamp apparatus is housed.

Another object of the invention is to provide tie-down apparatus which is operable automatically to maintain the force applied to the article to be tied down.

A further object of the invention is to provide tie-down apparatus which is operable with anchoring ropes or lines of any length.

Other objects and advantages of the invention will be pointed out specifically or will become apparent from the following description when it is considered in conjunction with the appended claims and the accompanying drawings, in which:

FIGURE 1 is a fragmentary, elevational view of the apparatus;

FIGURE 2 is a vertical sectional view of the apparatus;

FIGURE 3 is a sectional view taken on the line 3—3 of FIGURE 2; and

FIGURE 4 is a sectional view taken on the line 4—4 of FIGURE 2.

Apparatus constructed in accordance with the invention comprises a hollow housing or casing 1 having side walls 2 and 3, end walls 4 and 5, and top and bottom walls 6 and 7. The end wall 4 is provided with an inlet opening 8 through which a flexible line or rope 9 may be introduced to the casing, and the bottom wall 7 is shaped to provide an outlet opening 10 through which the line 9 may exit or leave the casing. The openings 8 and 10 are formed on lines $a$ and $b$ that intersect one another at substantially 90° at a point $x$ located within the casing 1.

Means is provided for detachably securing the casing to a fixed support (not shown) and comprises a loop 11 having a headed shank 12 that is swivelly mounted in the casing end wall 5 at a level coinciding with the level of the opening 8 and in prolongation of the intersecting line $a$. To the loop 11 is secured one end of a hook 13 which may be engaged in any convenient manner with a fixed support.

Within the housing 1 is a turning member or pulley 14 that is rotatably journaled on a shaft 15 fixed to the side walls 2 and 3. The flexible line 9 is reeved or trained around the pulley 14 and the position of the shaft 15 is such that it is located at a greater distance from the inlet opening 8 than is the intersection point $x$. The radius of the pulley 14 is so selected that the path of entry of the rope into the casing will coincide with the intersecting line $a$.

Guide means 16 is provided to guide the rope 9 from the pulley 14 to the outlet 10 and comprises an elongated member 17 having a substantially linear portion secured at its opposite side edges to the opposite side walls 2 and 3 and terminating at the end adjacent the pulley 14 in an outwardly turned flange 17$a$ so as to avoid interference between the rope and the inner terminal end of the guide. The opposite end of the linear portion terminates in an outwardly curved portion 17$b$ which forms a smoothly rounded juncture between the linear portion and the outlet opening 10. The position and inclination of the guide 15 are such that it defines an exiting path for the rope 9 which diverges from the entering path at an acute angle of less than 90°.

The apparatus includes releasable clamp means 19 for clamping the rope 9 in any selected position of adjustment relative to the housing 1. The clamp means comprises an arm 20 which is fixed at one of its ends to a shaft 21 that is journaled in the casing walls 2 and 3 and projects through one of the walls to form a manually operable handle 22 for rocking the arm 20 between clamping and releasing positions. The other end of the arm 20 is curved to extend toward the guide member 16 and terminates in serrations 21 which are adapted to engage the rope 9 and clamp the latter against the guide. The clamp arm 20 constantly is urged into clamping engagement with the rope by means of a spring 23 which reacts between the arm 20 and the housing wall 4. Studs 24 and 25 may be mounted on the parts 4 and 20, respectively, so as to provide retaining seats for the opposite ends of the spring.

The end of the rope 9 which extends through the outlet 10 preferably is free, although it may be provided with a knot or other enlargement (not shown) to prevent its being drawn through the housing. The opposite end of the rope 9, however, preferably is secured to a hook or the like 26 for releasable connection to the article to be tied down.

In the operation of the apparatus, the housing 1 may be secured by means of the hook 13 to a fixed object such as a truck body. The hook 26 then may be connected to an article to be tied down to the truck, whereupon a force may be applied to the free end of the rope 9 so as to pull the rope through the housing, thereby drawing the hook 26 toward the housing. As the rope is drawn through the housing, tensile force will be applied to that portion of the rope lying between the hook 26 and the pulley 14. This tensile force will be transmitted to the anchor hook 11. Since the member 11 is secured to the casing at the same level as the level of the opening 8, and in axial alignment with the entering path of the rope, the imposition of tensile forces on the rope 9 and the member 11 will not cause the casing 1 to rock or twist. When sufficient tension has been imposed on the article to be clamped, the free end of the rope 9 may be released, whereupon the spring 23 will act on the clamp arm 20 to move the latter into engagement with the rope and automatically maintain the rope in fixed position relative to the housing. The inclination of the guide 16 enables it to share with the pulley 14 the forces exerted by the tensile stressing of the rope. When it is desired to release the clamped article, the handle 22 may be rocked in such direction as to withdraw the arm 20 from engagement with the rope.

The disclosed embodiment is representative of a presently preferred form of the invention, but is intended to be illustrative rather than definitive thereof. The invention is defined in the claims.

I claim:

1. Tie-down apparatus for use with a flexible line, said apparatus comprising a housing having an inlet and an outlet through which said line may extend along entering and exiting paths; a turning member supported in said housing around which said line may be trained; linear guide means supported in said housing between said turning member and said outlet and establishing said exiting path at an acute angle of less than 90° to said entering path; anchor means secured to said housing at a point in prolongation of said entering path; clamp means supported in said housing for clamping said line against said guide means; yieldable means constantly biasing said clamp means toward its clamping position; manually operable means connected to said clamp means and extending externally of said housing for moving said clamp means out of its clamping position; and means on said housing for mounting the latter on a support.

2. Tie-down apparatus for use with a flexible line, said apparatus comprising a hollow housing having an inlet and an outlet opening into said housing along lines intersecting at substantially 90° to one another, said inlet and outlet enabling said flexible line to extend through said housing along entering and exiting paths; anchor means secured to said housing at a point in prolongation of said entering path; a turning member mounted in said housing at a point on the intersecting line of said inlet but at a greater distance from said inlet than the distance from said inlet to the zone of intersection of said intersecting inlet and outlet lines; linear guide means supported in said housing between said turning member and said outlet and establishing said exiting path at an acute angle of less than 90° to said entering path; releasable clamp means rockably supported in said housing for rocking movements toward and away from said guide means and adapted to clamp said line in fixed position against said guide means; spring means acting on said clamp means and constantly biasing the latter toward said guide means; and manually operable means connected to said clamp means and extending externally of said housing for rocking said clamp means away from said guide means.

3. The apparatus set forth in claim 2 wherein said turning member comprises a wheel journaled at said point for rotation, said wheel having a radius such that the entering path of said flexible line is coincident with the intersecting line of said inlet.

4. Tie-down apparatus comprising a hollow housing having an inlet and an outlet opening into said housing along lines intersecting at substantially 90° to one another; releasable anchor means secured to said housing on the side of the latter opposite said inlet and coaxial therewith for connecting said housing to a support; a flexible line extending through said housing; a turning member mounted in said housing at a point on the intersecting line of said inlet but at a greater distance from said inlet than the distance from said inlet to the intersection of said intersecting inlet and outlet lines, said flexible line being trained around said turning member; linear guide means supported in said housing between said turning member and said outlet and guiding said flexible line to said outlet along a path at an acute angle to the path of said flexible line from said turning member to said inlet; releasable clamp means rockably mounted in said housing for rocking movement toward and away from said guide means for releasably clamping said flexible line against said guide means, spring means acting on said clamp means and constantly biasing the latter toward said guide means; and manually operable means connected to said clamp means for rocking the latter away from said guide means.

References Cited by the Examiner

UNITED STATES PATENTS

| 418,555 | 12/1889 | Dow | 24—134 |
| 1,453,027 | 4/1923 | Tham | 24—134 |
| 2,158,826 | 5/1939 | Lorentzen. | |
| 2,196,938 | 4/1940 | Parnell | 24—134 |
| 2,469,783 | 5/1949 | Pipia | 24—134 |

FOREIGN PATENTS 1,127,563  12/1956  France.

BERNARD A. GELAK, *Primary Examiner.*